United States Patent
Arseneau et al.

(10) Patent No.: US 8,921,796 B1
(45) Date of Patent: Dec. 30, 2014

(54) MULTIPLE DISCRIMINATOR PET WITH PILEUP EVENT DETECTION

(71) Applicants: Roger E. Arseneau, Buffalo Grove, IL (US); James Frank Caruba, Bartlett, IL (US)

(72) Inventors: Roger E. Arseneau, Buffalo Grove, IL (US); James Frank Caruba, Bartlett, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/010,953

(22) Filed: Aug. 27, 2013

(51) Int. Cl.
 *G01T 1/10* (2006.01)
 *G01T 1/29* (2006.01)

(52) U.S. Cl.
 CPC ..................... *G01T 1/2985* (2013.01)
 USPC ........................................................ 250/362

(58) Field of Classification Search
 CPC ... G01T 1/2985; G01T 1/1611; G01T 1/1615; G01T 1/1642; G01T 1/172; A61B 6/037
 USPC ........................................................ 250/362
 See application file for complete search history.

(56) References Cited

U.S. PATENT DOCUMENTS

| | | | | |
|---|---|---|---|---|
| 4,152,596 A | * | 5/1979 | Marshall, III | 250/358.1 |
| 5,132,540 A | * | 7/1992 | Adolph et al. | 250/369 |
| 5,585,637 A | * | 12/1996 | Bertelsen et al. | 250/363.03 |
| 5,608,221 A | * | 3/1997 | Bertelsen et al. | 250/363.03 |
| 7,115,880 B2 | | 10/2006 | Arseneau | |
| 8,446,308 B2 | * | 5/2013 | Burr et al. | 341/156 |
| 2002/0121603 A1 | * | 9/2002 | Wong et al. | 250/363.09 |
| 2004/0027183 A1 | * | 2/2004 | Binkley | 327/172 |
| 2007/0238950 A1 | | 10/2007 | Vija et al. | |
| 2008/0073541 A1 | | 3/2008 | Vija et al. | |
| 2010/0014730 A1 | | 1/2010 | Hahn et al. | |
| 2010/0076300 A1 | | 3/2010 | Arseneau et al. | |
| 2010/0102239 A1 | | 4/2010 | Hahn et al. | |
| 2011/0089327 A1 | | 4/2011 | Vija et al. | |
| 2011/0220802 A1 | * | 9/2011 | Frisch et al. | 250/363.03 |
| 2012/0089007 A1 | | 4/2012 | Caruba et al. | |
| 2012/0101779 A1 | | 4/2012 | Arseneau | |
| 2012/0121050 A1 | * | 5/2012 | De Geronimo | 375/354 |
| 2012/0143036 A1 | * | 6/2012 | Arseneau | 600/407 |

* cited by examiner

*Primary Examiner* — Kiho Kim
(74) *Attorney, Agent, or Firm* — Peter Kendall

(57) ABSTRACT

A positron emission tomography (PET) system includes a PET detector configured to generate energy signals indicative of a set of events at the PET detector, a first discriminator coupled to the PET detector and configured to generate a primary timing signal in response to a primary event of the set of events, a second, derivative-based discriminator coupled to the PET detector and configured to generate a pileup timing signal in response to a piled-up event of the set of events, and a logic circuit to gate the primary and pileup timing signals of the first and second discriminators.

20 Claims, 5 Drawing Sheets

MULTIPLE DISCRIMINATOR PET WITH PILEUP EVENT DETECTION

BACKGROUND

The present embodiments relate to positron emission tomography (PET).

Nuclear medicine uses radiation emission to acquire images that show the function and physiology of organs, bones or tissues of the body. Radiopharmaceuticals are introduced into the body by injection or ingestion. These radiopharmaceuticals are attracted to specific organs, bones, or tissues of interest. The radiopharmaceuticals cause gamma photons to emanate from the body, which are then captured by a detector. The interaction of the gamma photons with a scintillation crystal of the detector produces a flash of light. The light is detected by an array of optical sensors of the detector.

PET is a nuclear medicine imaging technique that uses a positron emitting radionuclide. PET is based on coincidence detection of two gamma photons produced from positron-electron annihilation. The two gamma photons travel in generally opposite directions from the annihilation site, and can be detected by two opposing detectors of a ring of detectors. Annihilation events are typically identified by a time coincidence in the detection of the two gamma photons. The opposing detectors identify a line-of-response (LOR) along which the annihilation event occurred.

PET imaging systems use discriminators to detect the timing of the annihilation events. Various types of discriminators have been used in an effort to improve the timing resolution and system sensitivity of PET imaging systems, such as time-of-flight (TOF) PET systems. In TOF PET systems, the timing resolution is sufficiently precise to measure the arrival time difference between the two gamma photons. The time difference is then used to constrain the emission point to a range along the LOR.

Unfortunately, the discriminators used in TOF PET systems often have long recovery times, during which the discriminators are unable to detect events. The dead time of a discriminator is the time during which additional events are blocked from being detected. The detector signals for events occurring during dead times create a condition referred to as "pileup," and are typically rejected.

SUMMARY

By way of introduction, the embodiments described below include systems and methods of pileup detection in a multiple positron emission tomography (PET) system having multiple discriminators. One of the discriminators is configured to detect a primary event of a pileup event stream. Another one of the discriminators is configured to detect a piled-up event of the pileup event stream.

In a first aspect, a PET system includes a PET detector configured to generate energy signals indicative of a set of events at the PET detector. A first discriminator is coupled to the PET detector and configured to generate a primary timing signal in response to a primary event of the set of pileup events. A second, derivative-based discriminator is coupled to the PET detector and configured to generate a pileup timing signal in response to a piled-up event of the set of pileup events. A logic circuit gates the primary and pileup timing signals of the first and second discriminators.

In a second aspect, a method of imaging with a PET system is provided. A first timing signal is generated with a derivative-based discriminator of the PET system in response to a primary event of a set of events detected by a plurality of PET detectors of the PET system. A second timing signal is generated with a non-derivative-based discriminator of the PET system in response to the primary event. A third timing signal is generated with the derivative-based discriminator in response to a piled-up event of the set of events detected by the plurality of PET detectors of the PET system. The second and third timing signals are directed to a timestamp circuit of the PET system.

In a third aspect, a data acquisition system of a PET system includes an analog-to-digital converter configured to generate digital representations of PET detector energy signals indicative of a set of events. A first discriminator is coupled to the analog-to-digital converter and configured to generate a primary timing signal in response to a primary event of the set of events. A second, derivative-based discriminator is coupled to the analog-to-digital converter and configured to generate a pileup timing signal in response to a piled-up event of the set of events. A logic circuit is configured to gate the primary and pileup timing signals of the first and second discriminators.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
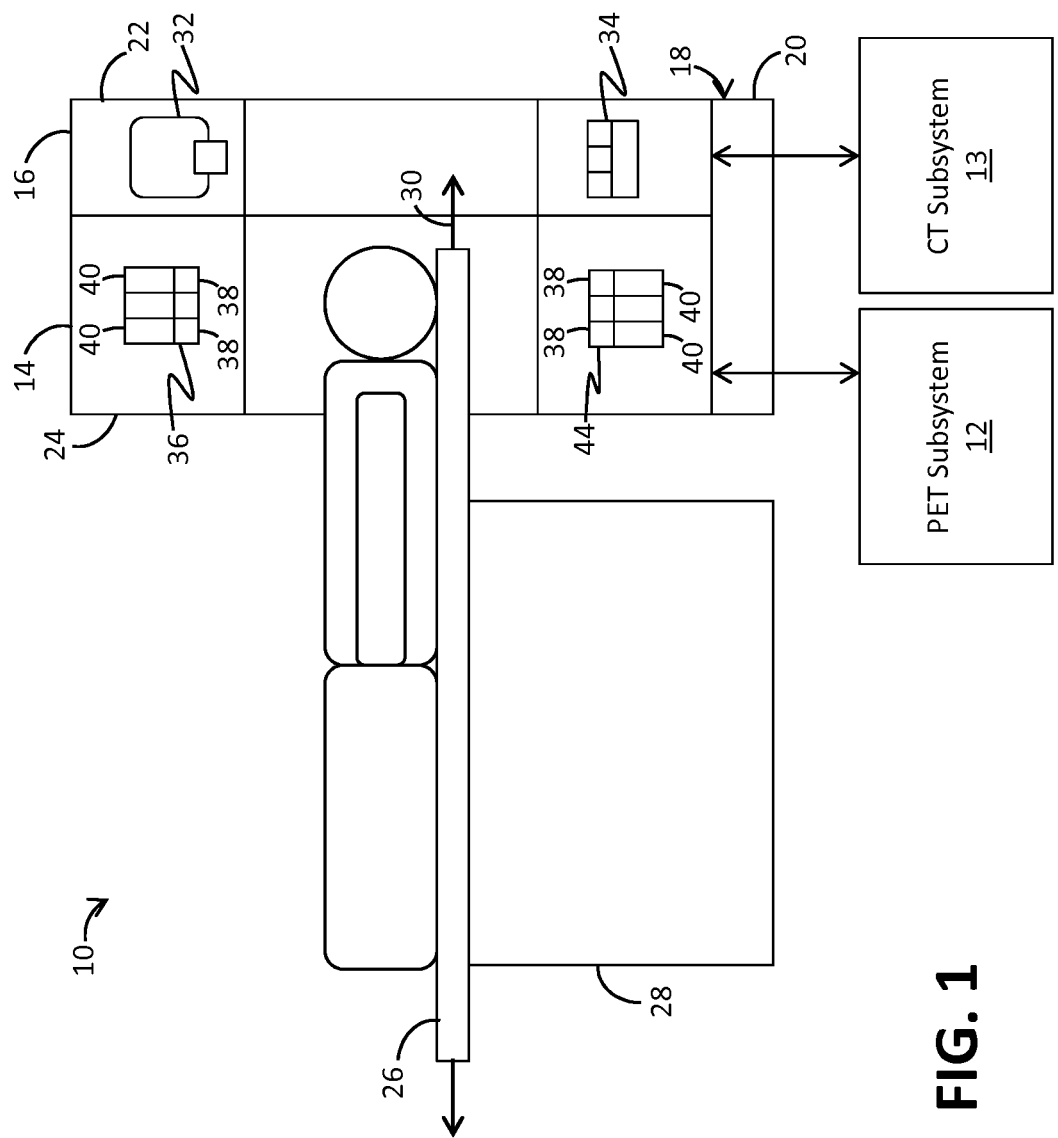
FIG. 1 is a block diagram of a PET-CT imaging system in accordance with one embodiment.

Positron emission tomography (PET) systems and methods are configured for pileup event detection and correction. The disclosed PET systems include multiple discriminators to provide such pileup detection and correction. The use of multiple discriminators may allow the pileup events to be detected without sacrifices in timing resolution performance. Full (or non-pileup) events and the first or primary event of a set of pileup events may be detected with a discriminator with high precision. Any piled-up events may be detected with one or more additional discriminators of a different type than the discriminator used for the first event. The multiple discriminators may be used to avoid rejecting piled-up events due to a long recovery time of a discriminator having high timing resolution or precision. In some embodiments, a data acquisition system of the disclosed PET systems includes a dual discriminator architecture in which a first discriminator has high precision and a second discriminator has a short recovery time. Other architectures having varying numbers of discriminators may be used.

The disclosed embodiments are configured to take advantage of the strengths, while compensating for any weakness, of a particular discriminator technology. The strengths and weaknesses of the discriminator technologies may relate to the timing resolution, resolving time, and/or dead time of the discriminator. Timing resolution is indicative of the accuracy or precision with which two independent discriminators are capable of detecting the arrival of gamma events related to one positron annihilation. Resolving time refers to the smallest time between two successive events detectable by the discriminator. Dead time refers to the time spent by the detector and/or the discriminator during which additional events are blocked from being detected or otherwise non-detectable.

Timing resolution is a strength of constant fraction discriminators (CFD), energy normalized leading edge discriminators (ENLED), and other leading edge discriminator (LED) technologies. Recovery time is a weakness of each of these technologies. The long recovery times of these technologies may render the technologies unsuitable for detecting piled-up events. Systems having such discriminator technologies may have increased dead time and reduced system sensitivity due to the rejection of piled-up events (e.g., by an upper level energy discriminator (ULD)). In contrast, second derivative discriminator (SDD) and other derivative-based discriminator technologies have short (or very short) recovery times, which is an advantage for reliably detecting piled-up events. However, the timing resolution of the SDD or other derivative-based discriminators is larger relative to the CFD, ENLED, and other LED technologies.

The disclosed embodiments may use the timing resolution of the CFD, ENLED, or other LED technologies to detect the first or primary event of a pileup event stream. The high timing resolution of such discriminator technologies may allow the disclosed embodiments to be used in time-of-flight (TOF) PET systems, although the disclosed embodiments are not limited to TOF PET systems. The disclosed embodiments may then use the SDD or other derivative-based technologies to detect subsequent piled-up events during the recovery time of the discriminator detecting the primary event.

The disclosed embodiments are not limited to particular discriminator technologies. A variety of discriminator technologies may be used for detecting non-pileup events or primary events of pileup event streams. Various discriminator technologies may also be used for detecting the piled-up events of a pileup event stream. The discriminators and other signal processing components of the disclosed embodiments may be implemented via analog circuitry, digital circuitry, or any desired combination thereof.

The disclosed methods and systems may be applied in the context of hybrid imaging modalities, such as those that combine PET scanning with x-ray computed tomography (CT). Although described below in the context of a PET-CT hybrid modality system, the disclosed systems and methods are not limited to use with any particular type of planning subsystem. Scan data used for planning the PET scan(s) and/or rendering the PET scan data (and/or other purposes) may be acquired via a variety of different types of scanners (e.g., projection, emission, magnetic resonance, etc.). For example, the planning or support modality need not include a CT scanner, and may include or involve any now or hereafter developed imaging technology. The planning or support modality need not include or involve tomography. In other embodiments, the dual discriminator arrangement is used in a PET system without an additional modality.

Output or timing response signals of the discriminators of the disclosed embodiments may be combined, controlled, or otherwise gated via discriminator arming conditions and/or gating logic for a timestamp circuit, such as a time-to-digital converter. For example, combinatorial logic may control the application of the discriminator output signals to a time-to-digital converter or other timestamp circuit. Alternatively or additionally, the output signals (or samples thereof) may be applied to computational logic or other types of logic to derive further information regarding the events. This logic may include circuitry to determine if the pileup events are too close in time to allow the event position or energy to be determined and then block the event transfer. The logic may additionally or alternative include circuitry to determine if the event is, in fact, two events so close in time that the data looks like a single event to the event detection circuitry.

FIG. 1 shows a hybrid positron emission tomography (PET) and x-ray computed tomography (CT) system 10. The hybrid PET-CT system 10 includes a PET subsystem 12 and a CT subsystem 13. The PET subsystem 12 includes or is coupled to a PET scanner 14. The PET subsystem 12 and the PET scanner 14 may be configured as a time-of-flight (TOF) PET imaging system. The PET subsystem 12 is configured for pileup detection and correction as described below.

The CT subsystem 13 includes or is coupled to a CT scanner 16. In this example, the CT scanner 16 is disposed adjacent the PET scanner 14. The CT scanner 16 and the PET scanner 14 may be enclosed in a common housing or cover. The CT scanner 16 may be disposed along an outward or distal side of the PET scanner 14. The position of the CT scanner 16 may vary. For example, the CT scanner 16 may be spaced from the PET scanner 14. The construction, configuration, and other characteristics of the CT scanner 16 may vary. For example, the CT scanner 16 may include a C-arm unit.

Additional, different, or fewer components may be provided. For example, the PET-CT system 10 may include one or more additional scanners. Additional PET or CT sections or units may be incorporated. The system 10 may include additional or alternative imaging modalities or scanning equipment. For example, the system 10 may include a fluoroscopy projection unit.

The PET scanner 14 and the CT scanner 16 are structurally supported by a gantry 18. The gantry 18 may include a framework of structural components to support the operation of the PET and CT subsystems 12, 13. In this example, the gantry 18 includes a base 20, a CT gantry section 22, and a PET gantry section 24. The CT gantry section 22 and the PET gantry section 24 include respective frames that define corresponding tubular openings or bores or other openings within which a subject is positioned during scanning operation. The shape and size of the bores need not be similar as shown in FIG. 1. For example, the CT scanner 16 may have a laterally open examination subject bore or any other opening defining a field of view. The subject rests upon a bed, gurney, or other platform 26 supported by a table base 28. The platform 26 is movable in an axial or longitudinal direction 30 through the bores.

A number of structural components of the gantry 18 may be directed to support other movement occurring during operation. For example, the gantry 18 may be configured to support the rotational movement of an x-ray source 32 and a detector 34 of the CT scanner 16. The x-ray source 32 and the detector 34 may rotate within a housing or other cover or enclosure of the CT gantry section 22. The x-ray source 32 and the detector 34 may rotate about a longitudinal axis centered within the bores and corresponding with, or parallel to, the axial direction 30. The CT gantry section 22 and the PET gantry section 24 may share a common enclosure. The CT gantry section 22 and the gantry section 24 need not be adjacent or oriented relative to one another as shown.

The PET scanner 14 includes one or more detector rings 36. The detector rings 36 may be oriented about the longitudinal axis 30 around which the components of the CT scanner 16 rotate. The PET gantry section 24 is configured to support the detector rings 36. The detector rings 36 may include respective sets of detector blocks disposed in a ring arrangement. For example, each detector ring 36 may include a set of 48 detector blocks. Each detector block may, in turn, include a number of scintillation crystals 38 and optical detectors or sensors 40. The scintillation crystals 38 and optical sensors 40 may be arranged in a two-dimensional array within each detector block. For example, each detector block in the detector ring 36 of the PET scanner 12 may have a 13×13 array of scintillation crystals (e.g., 4 mm crystals). The optical sensors 40 may include photomultiplier tubes, silicon avalanche photodiodes (APDs), or other photosensors configured to detect the optical light created by the scintillation crystals 38. The light generated by each crystal array are captured by a number of the optical sensors 40 (e.g., four photomultiplier tubes per block) in each detector block. The scintillation crystals 38 may include bismuth germanium oxide, gadolinium oxyorthosilicate, or lutetium oxyorthosilicate crystals, but other crystals may be used.

In nuclear medicine imaging, such as PET, radioactive tracer isotopes, or radiopharmaceuticals, are taken internally, for example intravenously or orally. As the radioisotope undergoes positron emission decay (also known as positive beta decay), the radioisotope emits a positron, an antiparticle of the electron with opposite charge. The emitted positron travels in tissue for a short distance, during which time the positron loses kinetic energy, until the positron decelerates to a point where the positron interacts with an electron. The encounter annihilates both electron and positron, producing a pair of annihilation (gamma) photons moving in approximately opposite directions. These events are detected when the gamma radiation reaches one of the scintillation crystals 38 in the detector ring 36, creating a burst of light, which is detected by the optical detector(s) 40 in the detector block. The detector rings 36 thus capture data representing the radiation emitted, directly or indirectly, by the radiopharmaceuticals. The PET subsystem 12 forms images from the captured data.

Figure 2:
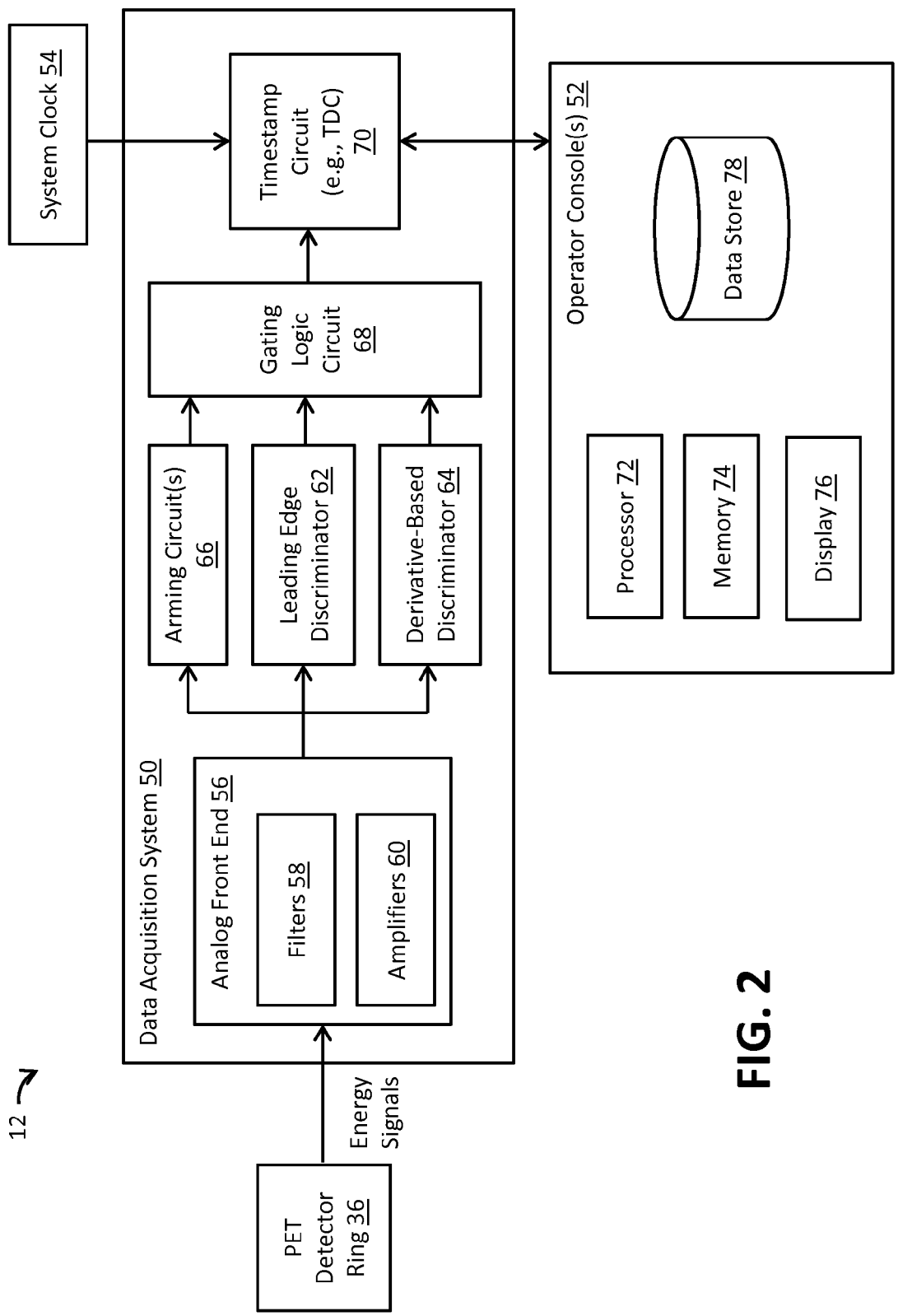
FIG. 2 is a block diagram of PET subsystem equipment of the PET-CT imaging system of FIG. 1 having dual discriminators for pileup event detection in accordance with one embodiment.

FIG. 2 shows processing equipment of the PET subsystem 12 in greater detail. The processing equipment may include a number of components for controlling the operation of the PET scanner 14, and/or for gathering, receiving, processing, rendering, and otherwise using or handling the signals generated by the PET scanner 14. The components may be directed to a variety of functions, including, for instance, power supply, control and other data communication, image data processing, system clock signals, and cooling. Some equipment, such as scanning and gantry equipment, of the PET subsystem 11A is not shown. Some of the components may support one or more functions of the CT scanner 16.

In this example, the PET subsystem 12 includes a data acquisition system 50 and an operator console 52. The data acquisition system 50 may be configured to receive, convert, and otherwise process the energy signals generated by one of the detector blocks of the PET detector ring 36. Multiple data acquisition systems 50 may thus be provided. The operator console 52 may be configured to direct or control the operation of the scanning components of the system 10 (FIG. 1), correct data generated by the data acquisition system 50, reconstruct images from the scan data, store data representative of the images, and display the images.

The data acquisition system 50 (and/or other subsystem components) may also be configured to control or otherwise support the scanning by providing power supply, timing, and other functionality for a number of PET detectors. In some cases, the data acquisition system 50 and the operator console 52 may provide some functions for both the PET and CT subsystems 12, 13.

The PET subsystem 12 may include a system clock 54 configured to provide a common time base for the signals generated by the detector blocks of the detector ring 36. In this embodiment, the system clock 54 is provided to the data acquisition system 50 for use in connection with digital sampling of the signals generated thereby. For example, the system clock 54 may be used for time-to-digital conversion or other time stamping, as described below. In other embodiments, the system clock 54 may be alternatively or additionally used to sample or generate a digital representation of the energy signals from the PET detector ring 36. The system clock 54 may be shared with the CT subsystem 13. In other cases, the clock and/or other support functions of the PET and CT subsystems 12, 13 are provided separately.

The system clock 54 may be used to generate common synchronization signals provided to the detector blocks of the detector ring 36. The common synchronization signals may be used to temporally correlate operation of the detector ring 36. In this embodiment, the synchronization signals are analog. In other embodiments, the synchronization signals are digital. A common time base may be provided via circuitry other than the system clock 54, and/or otherwise generated or maintained by the data acquisition system 50 or other circuitry of the PET subsystem 12.

The time base provided by the system clock 54 or other subsystem component is used to determine the timing of the events detected by the detector blocks. The data acquisition system 50 includes a number of components for processing the energy signals in connection with the timing determination. In this embodiment, the data acquisition system 50 includes a number of circuits configured to process the energy signals in the analog domain. The data acquisition system 50 includes an analog front end 56 to receive and condition the energy signals. In this example, the analog front end 56 includes front-end filters 58 and amplifiers 60. The front-end filters 58 may be configured to remove noise before the energy signals are amplified by the amplifiers 60. The configuration and characteristics of the front-end filters 58 and the amplifiers 60 may vary. For example, multiple stages of filtering and/or amplification may be implemented.

The data acquisition system 50 is configured to process or handle energy signals indicative of a set of events. The energy signals may be provided by a plurality of detectors. For example, the data acquisition system 50 may be configured to process the energy signals from the detectors arranged in a detector block. The energy signals from the photosensors (e.g., photomultiplier tubes) of the detector block may be aggregated for processing by the data acquisition system 50. Alternatively, the data acquisition system 50 is configured to process the energy signals provided by a respective one of the photosensors individually.

The set of events represented by the energy signals may occur sufficiently close in time (e.g., high count rates) to present a pileup condition. The data acquisition system 50 includes multiple discriminators to support high resolution of non-piled-up (or full integrate) events and primary events of pileup event streams, as well as to support detection and correction of piled-up events of such pileup event streams. In this embodiment, the data acquisition system 50 includes a discriminator 62 and a discriminator 64. The discriminator 62 may be configured as a high resolution discriminator. The discriminator 64 may be configured as a short recovery time discriminator. The discriminators 62, 64 may be arranged in parallel to receive the energy signals after processing by the analog front end 36. In this embodiment, the discriminators 62, 64 are configured to process analog representations of the energy signals. For example, each discriminator 62, 64 may include one or more comparators to detect the time at which the output signals of the processing of the energy signals cross zero. Each discriminator 62, 64 may then generate a timing response signal indicative of the timing of the zero crossing point or any other function related to the event start point in time.

The discriminators 62, 64 may be coupled to the detectors of the detector ring 36 via components other than or in addition to the analog front end 56. For example, and as described below in connection with FIG. 3, an analog-to-digital converter may sample the energy signals before processing by the discriminators 62, 64.

The discriminator 62 is configured to generate a primary timing signal in response to a primary event of the set of pileup events. The discriminator 62 may include or be configured as a leading edge discriminator (LED), such as an energy normalized leading edge discriminator (ENLED), a constant fraction discriminator (CFD), an energy normalized CFD, or other discriminator providing timing resolution sufficient to detect the primary event of the set of pileup events. The high resolution of the discriminator 62 may also be used to generate a timing response signal for non-piled-up events. The configuration of the discriminator 62 may vary, and may include or incorporate discriminator technologies developed in the future.

The discriminator 64 is configured to generate a pileup timing signal in response to a piled-up event of the set of pileup events. The discriminator 64 is configured as a derivative-based discriminator. The discriminator 64 may thus remove a baseline or other portion of the energy signal presented by the primary event of the pileup event stream. The discriminator 64 may provide a timing response signal with a quick recovery time to detect each subsequent event in the pileup event stream. For example, the discriminator 64 may include or be configured as a second derivative discriminator (SDD), a first derivative CFD, or other first derivative discriminator. While such discriminator technologies may have a lower timing resolution than those used in the discriminator 62, the detection at a lower resolution of piled-up events in a pileup event stream may provide more useful information than discarding the data for the pileup event stream altogether. The configuration of the discriminator 64 may vary, and may include or incorporate discriminator technologies developed in the future.

The data acquisition system 50 may include additional discriminators or discriminator technologies. For example, lower and upper level discriminators may be included to define a window of interest for a given isotope. Such discriminators may be used to discard noise (e.g., cosmic or other background noise) and to otherwise qualify events.

The data acquisition system 50 includes an arming circuit 66 configured to arm the discriminators 62, 64. The arming circuit 66 may generate one or more output signals in response to the energy signals provided via the analog front end 56. The output signals may be indicative of whether the energy signals contain event information rather than, for instance, noise. The output signals may be provided to, and used by, the discriminators 62, 64 to enable the discriminators 62, 64 to detect the timing of the events. In this embodiment, the arming circuit 66 includes analog circuitry, such as one or more comparators. The arming circuit 66 may be implemented using digital components as described below in connection with FIG. 3.

In some embodiments, the arming circuit 66 includes or is configured as a second derivative arming circuit. For example, the arming circuit 66 may be configured in accordance with the arming circuits described in U.S. Pat. No. 7,115,880 ("Digital Event Detection in a Nuclear Imaging System") and discriminators 64 may be configured in accordance with the timing circuits described in U.S. Patent Publication No. 2012/0101779 ("Digital Event Timing"), the entire disclosures of which are incorporated by reference. The former disclosure describes a derivative-based arming circuit, and the latter disclosure describes a derivative-based timing circuit. Additional or alternative arming circuits may be used. For example, a respective arming circuit may be used to arm each discriminator 62, 64 individually. Other types of arming circuits that may be used in connection with the discriminators 62 include a level detector to determine when the output exceeds a preset level or a first derivative level detector. For the discriminators 64, a first derivative level detector may be used.

The arming circuit 66 may be configured to enable the discriminators 62, 64 based on whether one or more events are detected. For instance, the arming circuit 66 may be configured to detect a pileup event stream, in which case the discriminators 62 may be enabled for the first event and the discriminator 64 may be armed for further events until there is a pause in the event stream.

The arming circuit 66 may also provide one or more control signals to a gating logic circuit 68 of the data acquisition system 50. The gating logic circuit 68 is configured to gate the primary and pileup timing signals of the discriminators 62, 64. In the embodiment of FIG. 2, the arming circuit 66 is coupled to the gating logic circuit 68 to provide a control signal to the gating logic circuit 68 to control the operation of the gating logic circuit 68. For instance, the control signal may be used by the gating logic circuit 68 to determine whether the gating logic circuit 68 allows the outputs of the discriminators 62, 64 to be recognized or otherwise further processed. The control signal may be indicative of whether multiple events (e.g., piled-up events) are present in the energy signals being processed.

The gating logic circuit 68 may be configured to track the timing response signals from the discriminators 62, 64. For example, the gating logic circuit 68 may generate one or more tracking or status signals indicative of whether a timing response signal has been received from either one of the discriminators 62, 64. The gating logic circuit 68 may alternatively or additionally generate a tracking or status signal indicative of whether the timing response signal from the discriminator 62 remains present. The gating logic circuit 68 may use such tracking signals to select the timing response signal on which to rely or pass. For example, the gating logic circuit 68 may include a number of gates (e.g., transistor circuits) to which the timing signals are applied. The gates may allow the timing signals to pass through based on the control signal(s) from the arming circuit 66 and/or other signals indicative of the operational status of the discriminators 62, 64 and/or other components of the data acquisition system 50. For example, a transistor-based gate of the gating logic circuit 68 may be configured to use an operational status signal indicative of whether a pileup event stream is present, whether a primary event of the pileup event stream has been processed, and/or other operational conditions. The operational status signal may be generated by the arming circuit 66 and/or a component of the gating logic circuit 68. In this embodiment, the gating logic circuit 68 is implemented in the analog domain, although the gating logic circuit 68 may be implemented via digital circuitry or any combination of analog and digital circuitry.

The gating logic circuit 68 may be configured to disregard or discard one or more of the timing signals generated by the discriminators 62, 64. This may occur even though the arming circuit 66 (or other component or signal) indicates the presence of multiple events (e.g., a pileup event stream). For example, the gating logic circuit 68 may be configured to discard a pileup timing signal generated by the discriminator 64 in response to the primary event. As described below and shown in connection with the timing diagram of FIG. 5, an SDD or other derivative-based discriminator may generate a timing signal in response to the primary event of a pileup event stream before the discriminator 62. The timing signal generated by the discriminator 64 may thus be discarded so that the timing signal from the discriminator 62 may instead be used to determine the timing of the primary event.

The data acquisition system 50 includes a timestamp circuit 70 configured to determine timing values for the events detected by the discriminators 62, 64. The gating logic circuit 68 may direct the timing response signals of the discriminators 62, 64 to the timestamp circuit 70 for timestamping. The timing response signals may be fed to the timestamp circuit 70 sequentially or otherwise to allow each event in a set of pileup events to be timestamped. In this embodiment, the timestamp circuit 70 includes a time-to-digital converter (TDC). The TDC may use the clock signal provided by the system clock 54 or other component to assign a digital representation of the timing of each event. The timestamp circuit 70 may be configured to generate the digital representation of the timing by computing the time difference between the zero crossing or other point detected by the discriminator 62, 64 and a synchronization signal, which may be derived from the system clock 54. The timestamp circuit 70 (or one or more components thereof) may be configured to operate in the digital domain. For example, the timestamp circuit 70 may include a field programmable gate array (FPGA) circuit to implement one or more timestamp functions.

The timestamp circuit 70 may be configured to determine the timing values based on offset data stored for the discriminators 62, 64. The timing values may thus reflect the delays introduced or encountered from the PET detector ring 36 and through the data acquisition system 50. The delay may vary based on which discriminator 62, 64 produces the timing response signal to be timestamped. Respective offset data for each discriminator 62, 64 may thus be in a memory, such as a memory or data store provided by the operator console 52. For example, a correction table or other data structure may be stored for each discriminator 62, 64. In alternative embodiments, the operator console 52 implements the timing value corrections.

The offset or other data used to generate the timing values for the data acquisition system 50 may be generated during an initial calibration procedure. The data processing channel for each PET detector block may be calibrated relative to reflect or reference the absolute time of the PET system (e.g., the system clock 54). The offset data for each data acquisition system 50 may be periodically corrected to ensure that each channel continues to be aligned with the absolute time. In some embodiments, one channel (or data acquisition system) is established as a reference channel, and the offset data for the other channels may be set relative thereto. Alternatively, the channels may be calibrated independently of one another. The use of offset data relative to a reference channel may be useful in systems where the time difference between two channels is typically a much smaller number than the time difference between a respective channel and the absolute time. In such cases, the correction tables or other data structures may consume less memory.

In the embodiment of FIG. 1, the gating logic circuit 68 is configured to provide data indicative of the timing signals to the timestamp circuit 70 via a single data connection or channel. Both primary and pileup timing signals are provided via the same data channel. The gating logic circuit 68 may be configured to provide the timing signals in a manner that appears to the timestamp circuit 70 as the output from a single discriminator. In such cases, a standard, commercially available TDC may thus be used in the timestamp circuit 70. The timing signals may be pipelined into a single TDC or other timestamp circuit 70. The expense of an additional TDC or other timestamp circuit 70 may be avoided. In an alternative embodiment, the gating logic circuit 68 is configured to provide data indicative of the primary and pileup timing signals to the timestamp circuit via multiple data channels. The timestamp circuit 70 may be configured to receive a pair of inputs, one for the timing signals of each discriminator 62, 64.

Additional, fewer, or alternative analog circuits may be provided to support the processing of the energy signals. Additional or alternative signal processing may be provided by digital electronics. Such digital electronics may be integrated with the above-described analog circuitry to any desired extent. The data acquisition system 50 may include additional circuitry for other functions, such as supplying power to the PET detector ring 36.

In the embodiment of FIG. 2, the operator console 52 provides both data processing and user interface functions for the PET subsystem 12 (and, in some cases, the CT subsystem 13). The data processing and user interface functions may be provided separately in other embodiments. For example, image reconstruction and other processing of the scan data may be implemented by a separate computing system. The PET and CT subsystems may be supported by respective operator consoles and/or computing systems. The operator console 52 may be in communication with the data acquisition system 50 to control the operation of the PET-CT system 10. The data acquisition system 50 may be integrated with the operator console 52 to any desired extent. In this example, the operator console 52 is configured to process PET and CT scan data provided by the data acquisition system 50. In other embodiments, a separate computing system may be provided for such processing.

The operator console 58 includes a processor 72, as well as a memory 74 and a display 76 coupled to the processor 72. The processor 72 may be configured to implement one or more data processing routines on the scan data provided by the data acquisition system 50. For example, the data processing routines may be configured to implement image reconstruction and other procedures to support overlays or other rendering of representations of the scan data on the display 76. The scan data may be stored in a database or other data store 78. The data store 78 may be configured to store the scan data (and/or other data) at one or more stages of processing.

The data processing routines implemented by the processor 72 may also be directed to correction of the scan data. For example, the correction(s) may be useful to address the above-referenced time offsets. The processor 72 may be configured to correct the scan data captured by the detector ring 36 for other purposes.

Scan data provided by the CT scanner 16 may be used for planning the scanning procedures to be implemented by the PET section 12. The scan data from the CT scanner 16 may also be used during image reconstruction, as an overlay, or for other purposes (e.g., registration and/or attenuation correction).

The data acquisition system 50, the operator console 52 and other subsystem equipment may include any number of respective processors configured to control and communicate with the scanning components of the PET-CT system 10 (FIG. 1). The data acquisition system 50 may include, for instance, a coincidence processor for the PET subsystem. Other processors may be configured to provide acquisition control for the CT and PET subsystems or PET image reconstruction.

The scanning operation of the PET and CT subsystems 12, 13 may be controlled and supported via the data acquisition system 50, the operator console 52, and/or other subsystem equipment using any known or hereafter developed techniques, as supplemented and/or otherwise modified as described herein.

The memory 74 or the data store 78 is a buffer, cache, RAM, removable media, hard drive, magnetic, optical, database, or other now known or later developed memory. The memory 74 or the data store 78 is a single device or group of multiple devices. The memory 74 or the data store 78 is shown within the PET subsystem 12, but may be outside or remote from other components of the PET subsystem 12, such as a database or PACS memory.

The memory 74 or the data store 78 may store data at different stages of processing. For example, the memory 74 may store raw data representing detected events without further processing, filtered or thresholded data prior to reconstruction, reconstructed data, filtered reconstruction data, an image to be displayed, an already displayed image, or other data. The memory 74 or the data store 78 (or a different memory) may store data used for processing, such as storing the data after one or more iterations and prior to a final iteration in reconstruction. For processing, the data bypasses the memory 74, is temporarily stored in the memory 74, or is loaded from the memory 74.

The memory 74 is additionally or alternatively a non-transitory computer readable storage medium storing processing instructions. For example, the memory 74 stores data representing instructions executable by the programmed processor 72 for reconstructing a positron emission tomography image for dynamic study and/or reconstructing an image in emission tomography. As another example, the memory 74 stores data representing instructions executable by a processor of the data acquisition system 50. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software stored or otherwise embodied on a computer-readable memory, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 72 is a general processor, digital signal processor, graphics processing unit, application specific integrated circuit, field programmable gate array, digital circuit, combinations thereof, or other now known or later developed device for processing emission information. The processor 72 is a single device, a plurality of devices, or a network. For more than one device, parallel or sequential division of processing may be used. Different devices making up the processor 72 may perform different functions, such as one processor for filtering and/or subtracting raw data or reconstructed images. The processor 72 may include an application specific integrated circuit or field programmable gate array for performing various operations, such as iterative reconstruction. In one embodiment, the processor 72 is a control processor or other processor of a PET imaging system. The processor 72 may be a processor of a computer or workstation.

The processor 72 operates pursuant to stored instructions to perform various acts described herein. For example, the processor 72 may be operable to process data indicative of detected events, correct for axial positioning, and implement iterative reconstructions from different collections of data. The processor 72 may be configured by code or instructions sets stored on a memory, by firmware, and/or by hardware to perform any or all of the acts described herein.

The display 76 is a CRT, LCD, plasma screen, projector, printer, or other output device for showing images generated by the PET subsystem 12. The display 76 may be used to display a user interface for controlling the PET subsystem 12 and/or CT subsystem 13. The CT subsystem 13 may have a separate display or user interface for control thereof. The display 76 may alternatively or additionally be used to display the PET images generated by the disclosed systems and methods. Such PET images may include separately rendered or reconstructed images from the respective PET sections and/or include an image with an extended FOV when the PET sections are adjacent.

The data acquisition systems described herein (e.g., the data acquisition system 50 of FIG. 2) may include one or more processors, memories, and/or other digital circuitry to support implementation of the PET data processing and/or control tasks related thereto. Additional or alternative analog or digital control circuits may be used.

The above-described PET and CT processing equipment may be integrated to any desired extent. For example, the system 10 may include integrated data acquisition systems and/or integrated operator consoles to control and/or operate the PET and CT subsystems.

Figure 3:
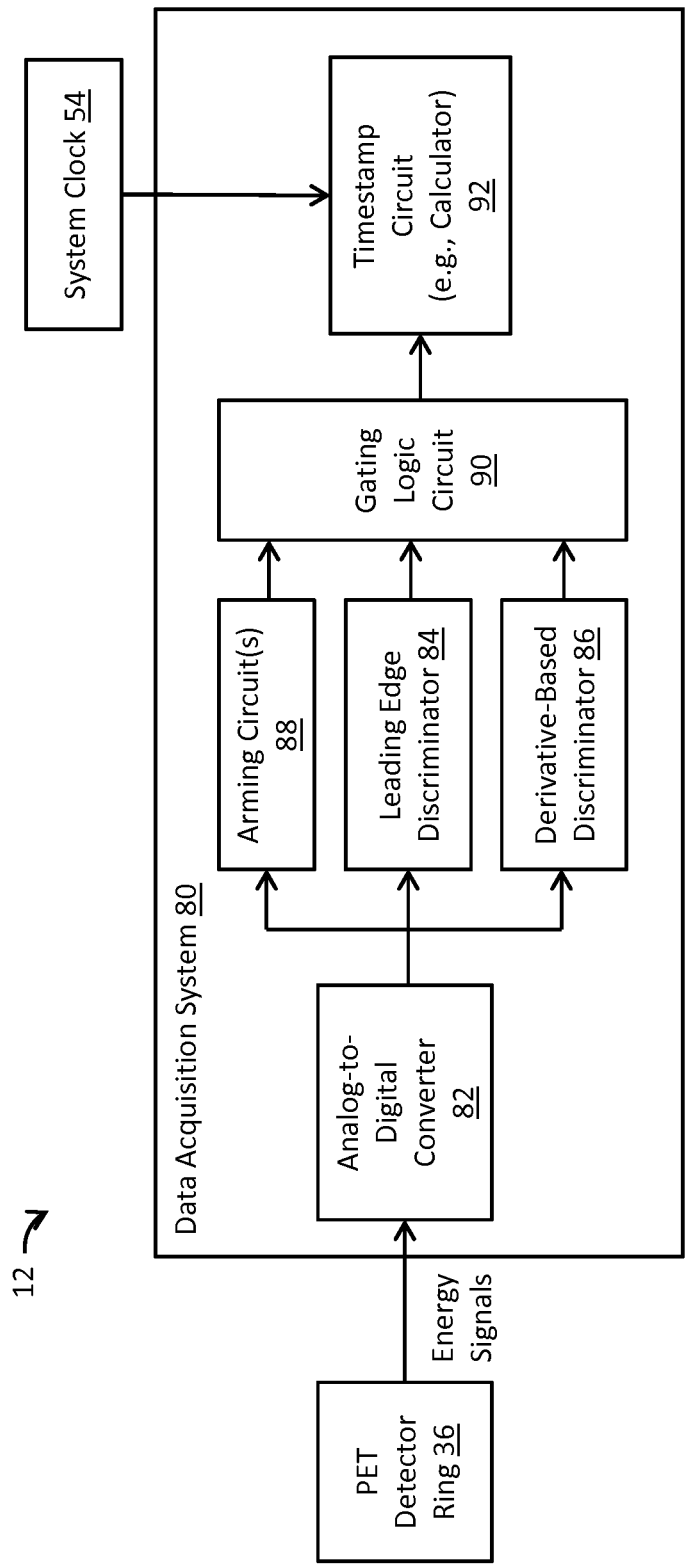
FIG. 3 is a block diagram of alternative PET subsystem equipment of the PET-CT imaging system of FIG. 1 having dual discriminators for pileup event detection in accordance with one embodiment.

FIG. 3 shows a data acquisition system 80 constructed in accordance with an embodiment in which the pileup detection and correction data processing is implemented in the digital domain. In this embodiment, the front end of the data acquisition system 80 includes an analog-to-digital converter 82 to sample the energy signals generated by the detectors of the PET detector ring 36. The analog-to-digital converter 82 converts the energy signals into corresponding digital representations of the energy signals. The sampling rate of the analog-to-digital converter 82 may be about 500 megasamples per second, but other rates may be used. The resolution of the analog-to-digital converter 82 may be 12 bits, but other data sizes may be used. In some cases, the front end of the data acquisition system 80 includes one or more filter and amplifier stages to prepare the energy signals for conversion or to filter the results of the conversion.

The data acquisition system 80 is configured to implement pileup detection and correction based on the digital representations of the energy signals. The data acquisition system 80 includes multiple discriminators coupled to the analog-to-digital converter 82 and configured to process the digital representations when the energy signals present a set of pileup events. In this embodiment, a leading edge discriminator 84 is provided and configured to generate a primary timing signal in response to a primary event of the set of pileup events. A derivative-based discriminator 86 is provided and configured to generate a pileup timing signal in response to a piled-up event of the set of pileup events. Other types of discriminator technologies may be used in the discriminator 84 for high resolution performance and in the discriminator 86 for quick recovery times.

In the embodiment of FIG. 3, the discriminators 84, 86 are implemented in the digital domain. For example, the discriminators 84, 86 may determine a timing response to the digital representation of the energy signals. The pair of samples of the timing response having values closest to zero may then be used to calculate (e.g., through interpolation) an indication of the timing of the event. Other detection schemes than zero crossing may be used. Each discriminator 84, 86 includes one or more FPGA circuits to generate the timing response signals. Other types of digital circuit components may be used, including, for instance, digital components implemented in application specific integrated circuits (ASICs).

An arming circuit 88 is used to enable and/or otherwise control the operation of the discriminators 84, 86. The arming circuit 88 may arm the discriminators 84, 86 as described above. The arming circuit 88 may also be coupled to the logic circuit to provide a control signal to a gating logic circuit 90 indicative of whether multiple events are present in the digital representations of the energy signals. In this embodiment, the arming circuit 88 includes digital circuitry, but the arming circuit 88 may control the discriminators 82, 84 as described above. For example, the arming circuit 88 may include one or more FPGA, ASIC, or other digital circuits responsive to the digital representation of the energy signals to implement a second derivative or other event detection procedure. Additional arming circuits may be provided.

The gating logic circuit 90 is responsive to the output of the arming circuit 88 to gate the timing signals of the discriminators 84, 86. The gating logic circuit 90 may be functionally similar to the gating logic circuits described above, but implemented digitally. For example, the gating logic circuit 90 may be configured to discard a pileup timing signal generated by the discriminator 86 in response to a primary event of the pileup event stream.

The data acquisition system 80 includes a timestamp circuit 92 configured to determine timing values for the set of pileup events. The determination may be based on offset data stored for the discriminators 84, 86, as described above. The timestamp circuit 92 may be configured as a timing calculation circuit that determines the timing of the event from the samples provided by the discriminators 84, 86. For example, the timestamp circuit 92 may be configured to implement an interpolation between the two samples closest to zero to determine the zero crossing point of the timing response signals generated by the discriminator 84, 86. The gating logic circuit 90 may provide the data indicative of the timing response signals to the timestamp circuit 92 via one or more channels, as described above.

Figure 4:
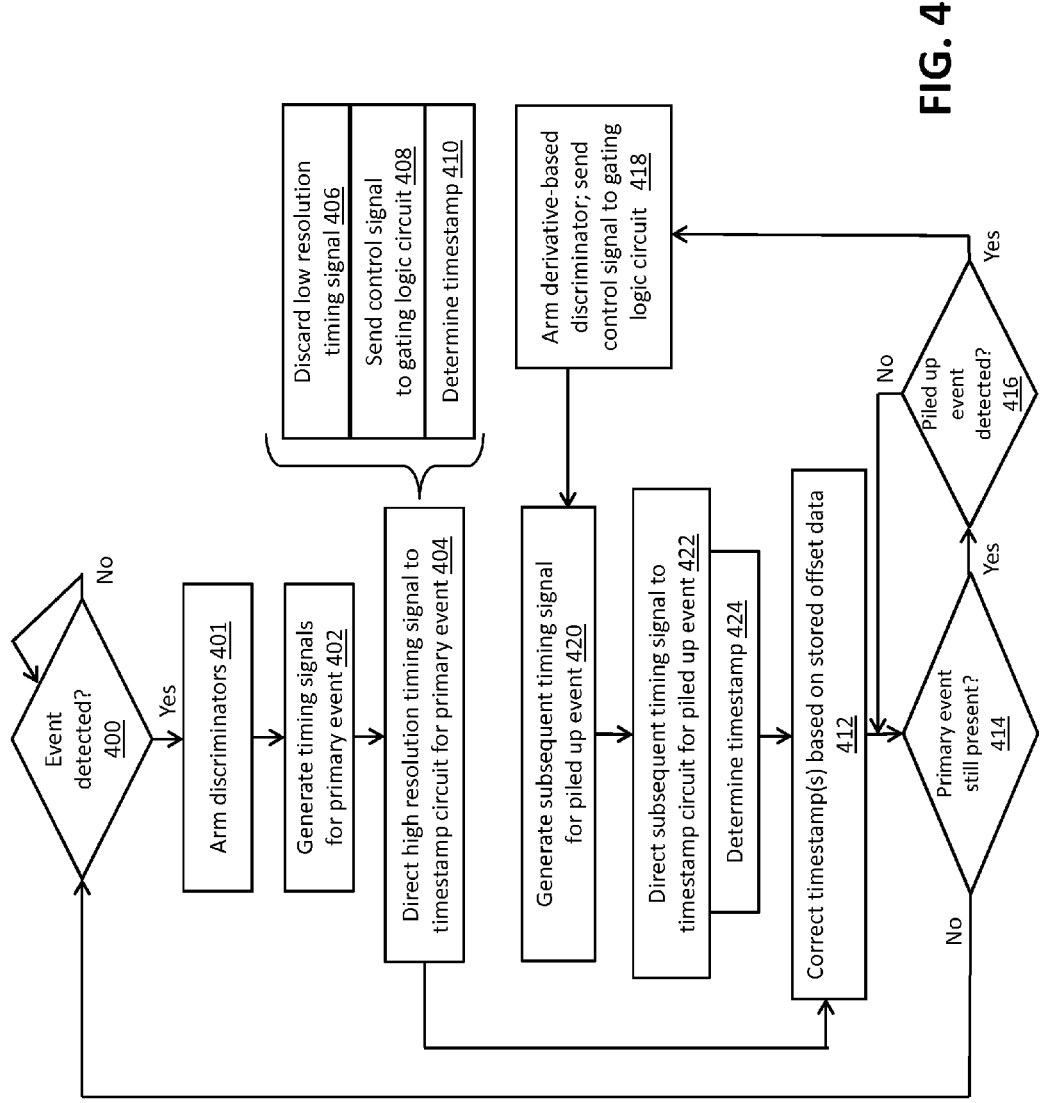
FIG. 4 is a flow diagram of a method of pileup event detection in a PET-CT imaging system having multiple discriminators in accordance with one embodiment.

FIG. 4 shows one embodiment of a method of imaging with a PET system having a multiple discriminator data processing circuit arrangement, such as the dual discriminator circuit architectures of the PET-CT system 10 described above. The method is performed by data processing circuitry, such as one or more components of the above-described data acquisition units. The method is performed in the order shown, but other orders may be used. For example, the discriminators may be armed after the determination that multiple events are present in the data stream. Additional, fewer, or alternative acts may be implemented. For example, the method may include one or more additional acts directed to individually correcting each respective timestamp determined by the timestamp circuit. The method may also include the acts implemented by other components of the PET system, including, for instance, the acts implemented by an analog front end of a data acquisition system. The configuration of the data processing circuitry used to implement the methods may vary. For example, the data processing circuitry may be constructed using analog or digital components.

The method begins with a decision block 400 in which the start of an event is detected. Once an event is detected, control passes to act 401 in which multiple discriminators of the PET system are armed by one or more arming circuits, as described above. The method may begin with a different act or decision block. For example, the method may begin with pre-processing of an incoming energy signal (e.g., filtering and/or amplification). Alternatively or additionally, the method may begin with (or include) a determination or detection by the arming circuit that an incoming energy signal presents data indicative of an event rather than, for instance, noise. In response to that determination, the discriminators may then be armed. In an alternative embodiment, the arming of a derivative-based discriminator does not occur for the first event but for only the pileup events.

Multiple timing signals are generated by the discriminators in act 402 for a primary event presented by the incoming energy signal. For example, an LED or other discriminator having high timing resolution and an SDD or other derivative-based discriminator having quick recovery time may both generate timing signals for the primary event.

In the embodiment of FIG. 4, a gating logic circuit or other component may then direct the timing signal generated by the high resolution discriminator to a timestamp circuit in act 404. The direction of the high resolution timing signal may be achieved as part of a gating procedure that includes discarding or disregarding in act 406 the low (or lower) resolution timing signal generated by the other discriminator (e.g., the quick recovery time discriminator). Discarding the low resolution timing signal may be useful as the signal may arrive before the timing signal generated by the high resolution discriminator (see, e.g., the timing diagram of FIG. 5). The timing signal is discarded using digital processing or by switching the output away from an event discriminator. The timing signal generated by the high resolution discriminator may thus be relied upon despite arriving later.

The gating procedure may include sending a control signal to the gating logic circuit (or other component implementing the gating process) in act 408. For example, the control signal may be generated and/or sent by the arming circuit. The control signal may be indicative of a status of the energy signal. For example, the status may indicate that the processing of a primary or non-piled-up event is in process. The gating logic circuit may include one or more components responsive to the control signal to discard the low resolution timing signal. The state of the control signal may change once the status changes (e.g., the arming circuit detects pileup).

A timestamp for the event (e.g., primary event) may then be calculated or otherwise determined in act 410 based on the high resolution timing signal, as described above. The timestamp determination may be implemented by a time-to-digital converter or other time calculation circuit upon the arrival of the timing signal.

After the primary event is processed in the acts 401, 402, 404, then control passes to act 412 in which one or more correction procedures are implemented to address any timing offsets, as described herein. Following the correction procedures, a number of blocks and acts are directed to determining whether a pileup event is present.

A decision block 414 may determine whether the response signal of the high resolution discriminator still reflects the presence of the primary event. The above-described arming circuits may implement the decision block 414. The decision block 414 may be implemented earlier in the method. For example, the arming circuit may implement the decision block 414 in parallel with, or before, the timestamp determination and/or correction acts. In some cases, the arming circuit may be configured to continuously determine whether the primary event remains present.

When there is no longer an event at the input, then control may return the act 400. In one embodiment, both discriminators are then disarmed in preparation for the next event stream.

If the primary event remains present, control passes to another decision block 416 in which the arming circuit determines whether a piled-up event is detected. If not, then control may return to the decision block 414 for further monitoring of the primary event status.

If the incoming energy signal presents a pileup event stream, then control passes to act 418 in which a derivative-based discriminator is armed by the arming circuit. In this example embodiment, the derivative-based discriminator is re-armed. In some cases, the act 418 may further include sending a control signal to the gating logic circuit indicative of whether multiple events are present. Another timing signal may then be generated by the derivative-based discriminator in act 420 in response to the first piled-up event of the pileup event stream. The timing signal is generated at a point subsequent to the generation of the previously generated timing signals.

In some embodiments, the arming circuit is configured to automatically arm or re-arm the derivative-based discriminator rather than implement the decision block 416. For example, the arming circuit may re-arm the derivative-based discriminator after a predetermined period of time has elapsed since the detection of the primary event. The time period may correspond with or be otherwise based on the recovery time of the derivative-based discriminator.

In act 422, the subsequent timing signal for the piled-up event is directed to the timestamp circuit. The gating logic circuit may be used to direct the timing signal via a single or multiple channel coupling to the timestamp circuit, as described above. A timestamp may then be determined in act 424 for the piled-up event.

One or more outputs of the timestamp circuit may then be processed to correct the timestamp(s) in the act 412. For example, the timestamps for the timing response signals generated for the primary and piled-up events may be corrected. The correction processing may be implemented by the timestamp circuit or any other processor. The timestamps may be corrected based on stored offset data for the respective discriminator and/or other components of the PET system involved in generating the timing response signals, as described above. The correction processing may be used to correlate the timestamps generated by multiple channels of the PET system. The offset data may be stored in the above-referenced memories or data stores. As noted above, the act 412 may be implemented when multiple events are not present (i.e., that pileup is not occurring). In that event, only one timestamp (i.e., the timestamp for the timing response signal generated by the high resolution discriminator) is corrected.

Figure 5:
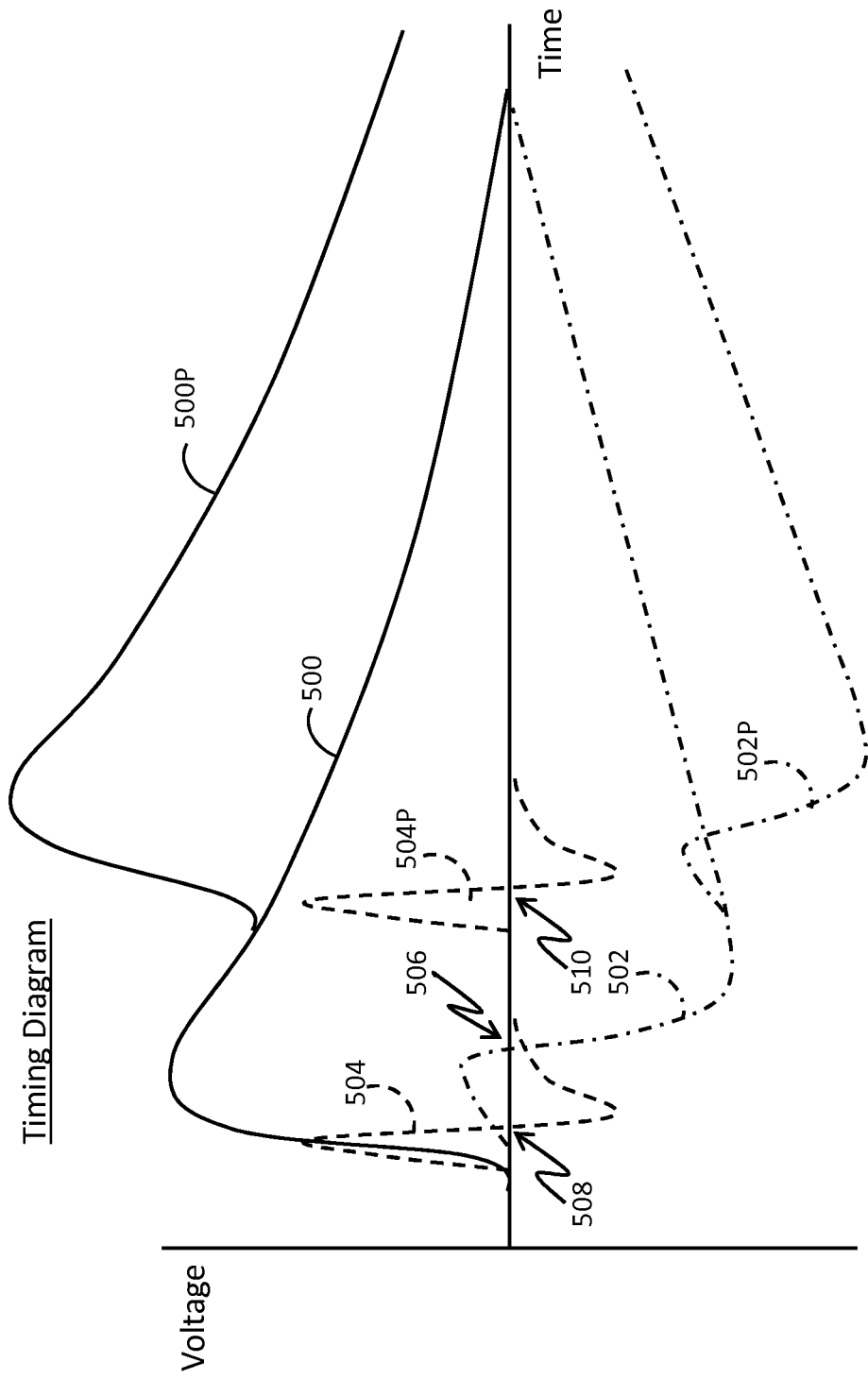
FIG. 5 is a graphical plot of a timing diagram depicting exemplary response signatures of discriminators of the PET-CT imaging system of FIG. 1.

FIG. 5 is a timing diagram to depict exemplary timing response signals from different types of discriminator technologies under a primary event followed by a pileup event. The timing response signals are generated in response to an energy signal 500 provided by a detector block. A CFD or other high resolution discriminator generates a timing response signal 502. An SDD or other quick recovery time discriminator generates a timing response signal 504. Signals 500P, 502P, and 504P depict a change in the signals 500, 502, and 504 casused by the pileup event. The timing response signal 502 from the high resolution discriminator has a zero crossing 506 detectable by, for instance, a comparator or other circuit component(s). The zero crossing 506 is for the primary event but not for the pileup event. The timing response signal occurs after a zero crossing 508 of the timing response signal 504 from the quick recovery time discriminator. There is also a zero crossing 510 for the quick recovery time discriminator 504 for the pileup event. The above-described gating logic circuitry may thus be configured to disregard the timing response signals 504 for the primary event.

FIG. 5 also depicts how the recovery times of the discriminators vary. The timing response signal 504 recovers, or returns to zero, in preparation for a subsequent event in a much shorter time than the timing response signal 502. A long tail of the timing response signal 502 lasts about as long as the energy signal 500 itself.

The response signatures of the multiple discriminators of the disclosed embodiments may vary from the examples shown in FIG. 5.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A positron emission tomography (PET) system comprising:
   a PET detector configured to generate energy signals indicative of a set of events at the PET detector;
   a first discriminator coupled to the PET detector and configured to generate a primary timing signal in response to a primary event of the set of events;
   a second, derivative-based discriminator coupled to the PET detector and configured to generate a pileup timing signal in response to a piled-up event of the set of events; and
   a logic circuit to gate the primary and pileup timing signals of the first and second discriminators.

2. The PET system of claim 1, wherein the first discriminator comprises a leading edge discriminator.

3. The PET system of claim 1, wherein the first discriminator comprises a constant fraction discriminator.

4. The PET system of claim 1, wherein the second discriminator comprises a second derivative discriminator.

5. The PET system of claim 1, wherein the first and second discriminators are configured to process analog representations of the energy signals.

6. The PET system of claim 1, further comprising an analog-to-digital converter to convert the energy signals into corresponding digital representations of the energy signals, wherein the first and second discriminators are configured to process the digital representations.

7. The PET system of claim 1, wherein the logic circuit is configured to discard a timing signal generated by the second discriminator in response to the primary event.

8. The PET system of claim 1, further comprising one or more arming circuits configured to arm the first and second discriminators and coupled to the logic circuit to provide a control signal to the logic circuit indicative of whether multiple events are present.

9. The PET system of claim 1, further comprising a timestamp circuit configured to determine timing values for the set of events based on offset data stored for the first and second discriminators.

10. The PET system of claim 9, wherein the logic circuit is configured to provide data indicative of the primary and pileup timing signals to the timestamp circuit via a single channel.

11. A method of imaging with a positron emission tomography (PET) system, the method comprising:
generating a first timing signal with a derivative-based discriminator of the PET system in response to a primary event of a set of events detected by a plurality of PET detectors of the PET system;
generating a second timing signal with a non-derivative-based discriminator of the PET system in response to the primary event;
generating a third timing signal with the derivative-based discriminator in response to a piled-up event of the set of events detected by the plurality of PET detectors of the PET system; and
directing the second and third timing signals to a timestamp circuit of the PET system.

12. The method of claim 11, wherein directing the second and third timing signals comprises discarding the first timing signal.

13. The method of claim 11, further comprising:
detecting multiple events of the set of events; and
sending a control signal to a gating logic circuit indicative of whether multiple events are detected.

14. The method of claim 11, wherein the second and third timing signals are directed to the timestamp circuit via a single channel.

15. The method of claim 11, further comprising correcting a timestamp value of the third timing signal based on timing offset data for the derivative-based discriminator.

16. A data acquisition system of a positron emission tomography (PET) system, the data acquisition system comprising:
an analog-to-digital converter configured to generate digital representations of PET detector energy signals indicative of a set of events;
a first discriminator coupled to the analog-to-digital converter and configured to generate a primary timing signal in response to a primary event of the set of events;
a second, derivative-based discriminator coupled to the analog-to-digital converter and configured to generate a pileup timing signal in response to a piled-up event of the set of events; and
a logic circuit to gate the primary and pileup timing signals of the first and second discriminators.

17. The data acquisition system of claim 16, wherein the logic circuit is configured to discard a further pileup timing signal generated by the second discriminator in response to the primary event.

18. The data acquisition system of claim 16, further comprising one or more arming circuits configured to arm the first and second discriminators and coupled to the logic circuit to provide a control signal to the logic circuit indicative of whether multiple events are present.

19. The data acquisition system of claim 16, further comprising a timestamp circuit configured to determine timing values for the set of events based on offset data stored for the first and second discriminators.

20. The data acquisition system of claim 19, wherein the logic circuit is configured to provide data indicative of the primary and pileup timing signals to the timestamp circuit via a single channel.

* * * * *